Nov. 6, 1934.    J. A. JENSEN    1,980,063
EMERGENCY VALVE FOR VEHICLE TANKS
Filed Sept. 28, 1932    2 Sheets-Sheet 1
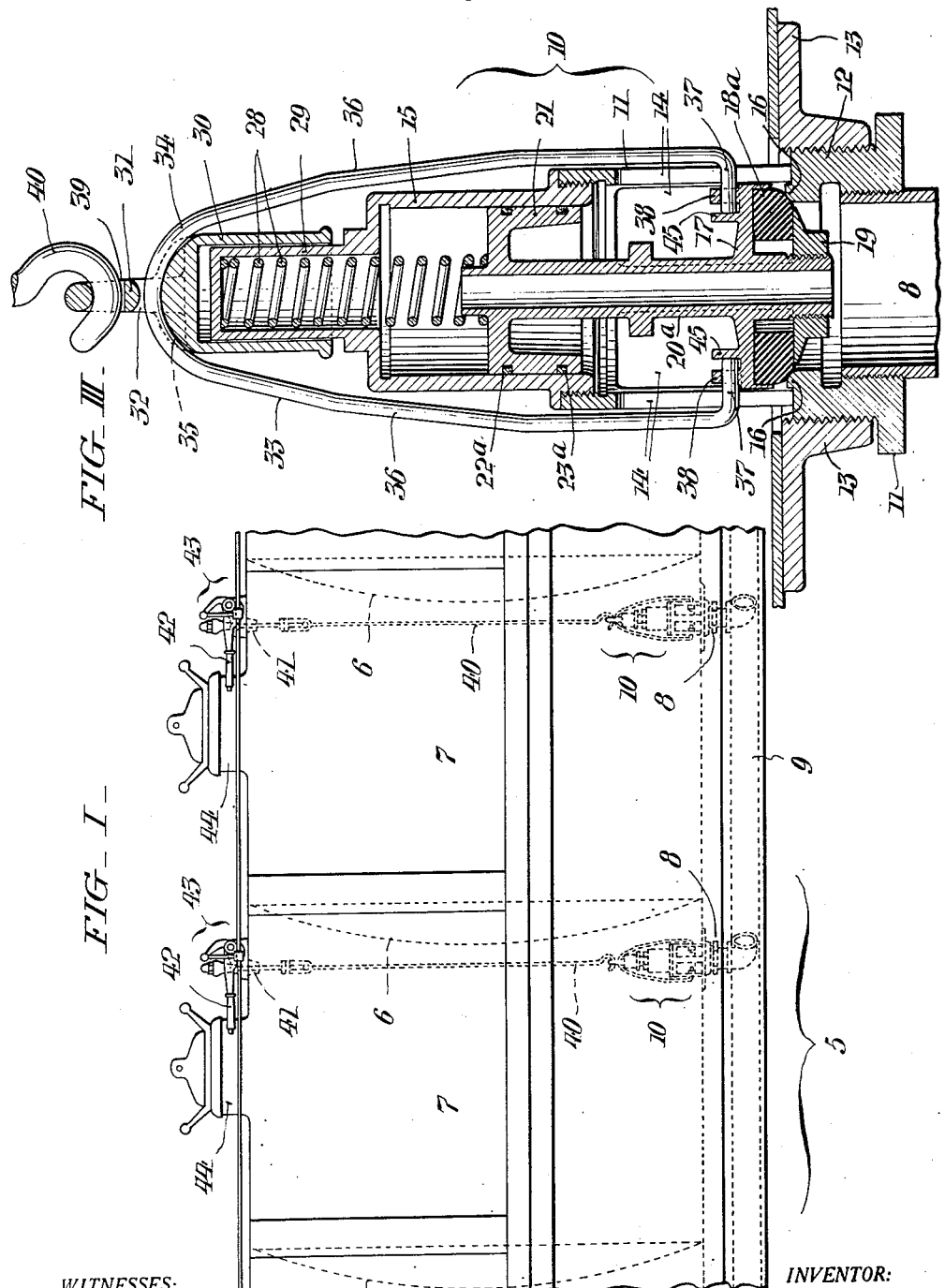
WITNESSES:
INVENTOR:
James A. Jensen,
BY
ATTORNEYS.

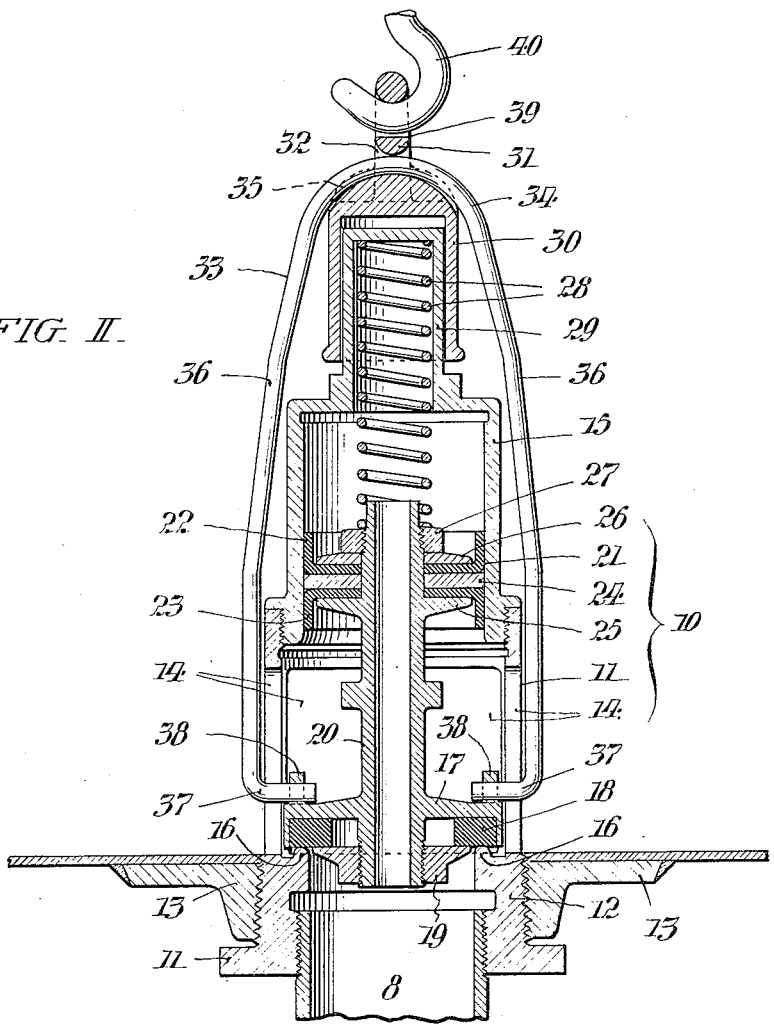
FIG. II.

Patented Nov. 6, 1934

1,980,063

UNITED STATES PATENT OFFICE 1,980,063

EMERGENCY VALVE FOR VEHICLE TANKS

James A. Jensen, Philadelphia, Pa., assignor to Quaker City Iron Works, Philadelphia, Pa., a corporation of Pennsylvania Application September 28, 1932, Serial No. 635,173

5 Claims. (Cl. 137—21)

This invention relates to emergency valves for tanks of vehicles such as are employed in the transport of gasoline and similar liquid commodities.

Vehicles of the kind referred to have their horizontal tanks subdivided into a series of separate compartments with individual outlets at their bottoms connecting into a common drain pipe or manifold, the said pipe extending rearward of the vehicle and being provided at its end with a faucet whereby the outflow of the contents can be controlled incident to draining. For the purpose of enabling individual draining of the tank compartments, their outlets are fitted with emergency valves which are normally kept closed by relatively light springs, but which are capable of being individually operated from above the tank; and mechanism is also usually provided whereby the emergency valves can be simultaneously opened or closed, as instanced in U. S. Patent No. 1,626,283 granted me on April 26, 1927. To prevent evaporation losses through turbulence of the liquids during filling, it is customary to charge the tanks through the bottom drain pipe or manifold above referred to, the liquids being delivered from a source of supply at a pressure ordinarily of forty to fifty pounds. Emergency valves for vehicle tanks, as heretofore constructed, when moved to closed position after the tank compartments are filled, will not remain closed in opposition to the delivery pressure of the liquids due to the weakness of their springs. This condition might be remedied by increasing the power of the springs, but such an expedient would be impractical by reason of the manual effort which would be required to open the valves.

My present invention is directed in the main toward overcoming the aforementioned difficulties. In other words, I aim to provide an emergency valve which will remain closed against the delivery pressure of the liquid and yet permit of being operated with a minimum of effort against comparatively light spring pressure. This desideratum I attain, as hereinafter fully disclosed by counteracting the effect of the fluid pressure upon the valve with creation of a balance under the conditions pointed out so that the valve is held in closed position solely under the influence of its spring.

Other objects and attendant advantages of this invention will be manifest from the following detailed description of the accompanying drawings, wherein Fig. I is a fragmentary view showing in part the side elevation of a vehicle tank whereof the individual compartments are fitted with my improved emergency valves.

Fig. II is a fragmentary sectional view of the tank, drawn to a larger scale illustrating the details of one of the valves; and, Fig. III is a view, similar to Fig. II, showing a slightly modified form of my novel valve.

In Fig. I, the vehicle tank is generally designated by the numeral 5, and shown as being divided by bulkheads 6 into a horizontal series of individual compartments 7, whereof the bottom outlets 8 connect with a longitudinal drain pipe or manifold 9. As delineated, this drain pipe or manifold 9 extends horizontally beneath the tank 5, and, at its rear end, is provided with a faucet (not shown) whereby the flow of the tank contents may be controlled incident to draining.

The emergency valves which I have devised to govern the outlets 8, so that the separate tank compartments 7 may be individually filled or drained, are indicated at 10 in Fig. I. From Fig. II it will be noted that each such emergency valve 10 comprises a hollow cylindric housing 11 with a threaded basal portion 12 which is screwed up into the flange 13 of the outlet 8 of the corresponding compartment 7, at the bottom of the tank 5. The portion of the housing 11 within the tank 5 is provided with a circumferential series of lateral ports 14; and into its upper end is screwed a cylinder 15. Cooperating with a seat 16 in the basal portion 12 of the lower housing member 11 is a discous closure member 17. The bottom face of this closure member 17 is recessed to receive a suitable non-metallic gasket 18 for engaging the seat 16 to form a fluid-tight seal therewith, said gasket being secured by a clamp nut 19 in screw engagement with the depending portion of the hollow axial stem 20 of the closure member 17. A piston 21 at the upper end of the stem 20 is designed to move up and down within the cylinder 15, which, it will be noted, is in communication with the manifold connection 8 by way of the by-pass formed by the axial hollow of the said stem. As shown in Fig. II, the piston 21 comprises a pair of reversely disposed cup-washers 22, 23 preferably made from gasoline-proof leather or oil-proof rubber with an interposed separating disk 24, said parts being engaged between a flange head 25 on the stem 20 and an opposing washer 26 and clamp nut 27 at the top of said stem, and thereby expanded into fluid-tight contact with the inside of the cylinder 15. A relatively light helical spring 28 is provided to normally hold the discous closure member 17 down against the seat 16 within the housing 11, said spring extending up into a diametrically reduced axial extension 29 of the cylinder 15 and having its lower end bearing against the piston 21. Slidable on the extension 29 of the cylinder 15 is a thimble-like guide 30 with a rounded top and a central upward projection 31 which is pierced as at 32. Engaging through the opening 32 in the projection 31 of the guide 30 is a yoke 33 which is fashioned from stout spring wire with a curved head 34 to fit a correspondingly curved diametral notch 35 in the top of the guide 30, and whereof the pendant extremities 36 reach down along opposite sides of the valve housing 11 and have their inwardly directed ends 37 engaging upstanding pierced ears 38 on the discous closure member 17. Immediately above the opening 32, the upward projection 31 of the guide 30 is formed with a second aperture 39 for engagement by the hooked bottom end of a pull rod 40.

Referring again to Fig. I, the pull rods 40 of the several emergency valves 10 extend up through packed fittings 41 in the top of the tank 5 for connection to the operating mechanism. This operating mechanism comprises handles such as shown at 42 in Fig. I, whereby the valves 10 may be individually opened; as well as connections comprehensively designated by the numeral 43 similar to those disclosed in my patent hereinbefore referred to, for operating the valves simultaneously. Since the present invention is concerned only with the construction of the emergency valves 10, no further mention need be made of the operating mechanism other than to re-state that it is of such character that said valves may be individually or simultaneously opened or closed as required or desired either during filling or emptying of the tank 5.

The operation of the valve is as follows: Let it be assumed that the valve 10 has just been closed manually after filling of the corresponding tank compartment 7 and that the manifold or pipe 9 is still connected to the source from which the liquid is supplied under pressure. Due to the hollow construction of the stem 20 of the closure member 17, the fluid pressure from the manifold by-passes to the cylinder 15 and acts upon the top of the piston 21 whereof the effective area, it will be noted, corresponds substantially to that of said closure member. Accordingly, the upward force operating on the closure member 17 from beneath and tending to open the valve 10 is balanced by the downward force of the liquid acting on the piston 21 from above so that the valve 10 is held closed solely by the inherent force of the helical tension spring 28. It also follows, as a consequence of the balanced conditions of the valve 10 when closed by the differential action of the pressure fluid, that opening of said valve necessitates only the overcoming of the force of the comparatively light spring 28.

From the foregoing it will be seen that I have provided a novel simple balanced emergency valve 10 for truck tanks which is easily opened and closed during filling while subjected to the action of the fluid coming from a source of supply under relatively high pressure. The valve 10 is moreover unique by virtue of the ease with which it may be installed. This is accomplished by screwing the housing 11 (with all the enclosed parts assembled) into the flange 13 of the outlet in the bottom of the corresponding tank compartment 7, and applying the laterally springable yoke member 33 (with the guide 30 previously attached) from within the compartment 7 through access had by way of the manhole 44 (Fig. I) at the top of such compartment.

In the modified form of my valve delineated in Fig. III, the piston 21 as a whole, is made integral with the hollow stem 20, and provided with vertically spaced circumferential grooves wherein are lodged double piston rings 22a and 23a, respectively, to seal against the inside of the cylinder 15. A further departure over the previously described embodiment of my invention will be noted in Fig. III is that the gasket 18a, in this instance, has its lower peripheral edge rounded for capacity to enter part way into the opening through the seat 16, and in that the closure member 17 is provided with supplemental integral projections 45 which serve as stops for the entrant ends 37 of the pendant extremities 36 of the spring yoke member 33, thereby to prevent the possibility of said extremities from dragging the sides of the valve casing 11. In all other respects the valve of Fig. III is identical with that of Fig. II, and, in order to avoid the necessity for repetitive description corresponding parts have, accordingly, been identified with the same reference numerals hereinbefore employed.

Having thus described my invention, I claim:—

1. An emergency valve for vehicle tanks comprising a tubular housing, a closure member in said housing to co-operate with a seat at the bottom drain outlet of the tank, which outlet may be connected to a pressure source of supply of the liquid with which the tank is to be filled, said closure member embodying a hollow stem with a piston in spaced relation to the closure member, the effective area of said piston corresponding substantially with that of the closure member whereby the valve is balanced; a comparatively light spring housed in an axial-extension of the housing aforesaid and operative against the piston to normally keep the valve closed; and means whereby the valve may be opened for filling of the tank.

2. An emergency valve for vehicle tanks comprising a tubular housing, a discous closure member in said housing to co-operate with a seat at the bottom drain outlet of the tank, which outlet may be connected to a pressure source of supply of the liquid with which the tank is to be filled, said closure member having a tubular stem and an attached piston in spaced relation to the closure member, the effective area of said piston corresponding substantially with that of the closure member and whereby the valve is balanced; a comparatively light spring housed in a diametrically-reduced axial-extension of the housing aforesaid and operative against the piston to normally keep the valve closed; and a yoke with means holding the same in alignment with the axis of the valve, said yoke ends engaging the closure member whereby the valve may be opened for filling of the tank.

3. An emergency valve for vehicle tanks comprising a tubular housing screwable into a bottom outlet of the tank, which outlet may be connected to a pressure source of supply of the liquid with which the tank is to be filled; a discous closure member embodying an open-ended hollow stem, said member having an inset gasket co-operative with the seat in a laterally ported lower portion of the housing and open to the interior of the tank; a coaxial cylinder at the top of the housing with an axial extension; a piston within the cylinder attached to the tubular stem of the discous closure member and in spaced relation to the latter, said piston having an effective area corresponding with that of the closure member whereby the valve is balanced; a comparatively light helical tubular spring within the cylinder exerting its force between the axial extension and the piston to normally hold the closure member to its seat; and yoke means engaging the discous closure member at opposite points with a connection actuable from above the tank to open the valve in opposition to the spring.

4. A balanced emergency valve for vehicle tanks comprising a tubular housing screwable into a bottom outlet of the tank, which outlet may be connected to a pressure source of supply of the liquid with which the tank is to be filled; a discous closure member embodying an open-ended hollow stem, said member cooperating with a seat in a laterally ported lower portion of the housing open to the interior of the tank; a coaxial cylinder at the top of the housing with a reduced axial extension; a piston in the cylinder carried by the open hollow stem of the discous closure member; a comparatively light helical spring within the cylinder exerting its force between the axial extension and the piston to normally hold the closure member on its seat; a thimble-like guide member slidable on the reduced axial extension of the cylinder; a laterally springable yoke with a head portion engaging through the guide member and pendant extremities reaching down opposite sides of the valve casing to engage apertured ears on the discous closure member; and means for actuating the valve to open it against the force of the spring including a connection downward through the tank from above to the guide member aforesaid.

5. The combination of claim 4 wherein the piston is formed integral with the hollow stem and apertured ears are provided on the discous closure member with associated stop projections to limit inward contraction of the laterally springable yoke.

JAMES A. JENSEN.